(12) United States Patent
Hiraguchi

(10) Patent No.: US 7,104,487 B2
(45) Date of Patent: Sep. 12, 2006

(54) RECORDING TAPE CARTRIDGE AND DRIVE DEVICE THEREOF

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/935,105

(22) Filed: Sep. 8, 2004

(65) Prior Publication Data

US 2005/0029380 A1 Feb. 10, 2005

Related U.S. Application Data

(62) Division of application No. 10/270,170, filed on Oct. 15, 2002, now Pat. No. 6,811,107.

(30) Foreign Application Priority Data

Oct. 15, 2001 (JP) ............................. 2001-317295

(51) Int. Cl.
*G11B 23/04* (2006.01)

(52) U.S. Cl. ..................... 242/338.4; 242/348; 360/93; 360/132

(58) Field of Classification Search ............ 242/338.4, 242/348, 348.2; 360/96.5, 132
See application file for complete search history.

(56) References Cited

U.S. PATENT DOCUMENTS

| 3,648,941 | A | | 3/1972 | Merry |
| 6,538,842 | B1 | * | 3/2003 | von Alten .................... 360/93 |
| 6,811,107 | B1 | * | 11/2004 | Hiraguchi .................. 242/348 |

FOREIGN PATENT DOCUMENTS

JP        11-126398 A       5/1999

* cited by examiner

*Primary Examiner*—John Q. Nguyen
(74) *Attorney, Agent, or Firm*—Sughrue Mion, PLLC

(57) ABSTRACT

A recording tape cartridge which can be assuredly positioned in a drive device. A positioning cover bridges across and parallel to a mounting portion of a bucket of the drive device. Stoppers are provided at corner portions of the positioning cover that are positioned at a deeper side of the bucket. Angled surfaces, which are surface-contactable with the stoppers, are provided at a magnetic tape cartridge. The magnetic tape cartridge can be positioned in horizontal directions in the drive device by surface-contacting the angled surfaces with the stoppers. Consequently, reference holes for positioning the magnetic tape cartridge in horizontal directions in the bucket are not required.

8 Claims, 9 Drawing Sheets

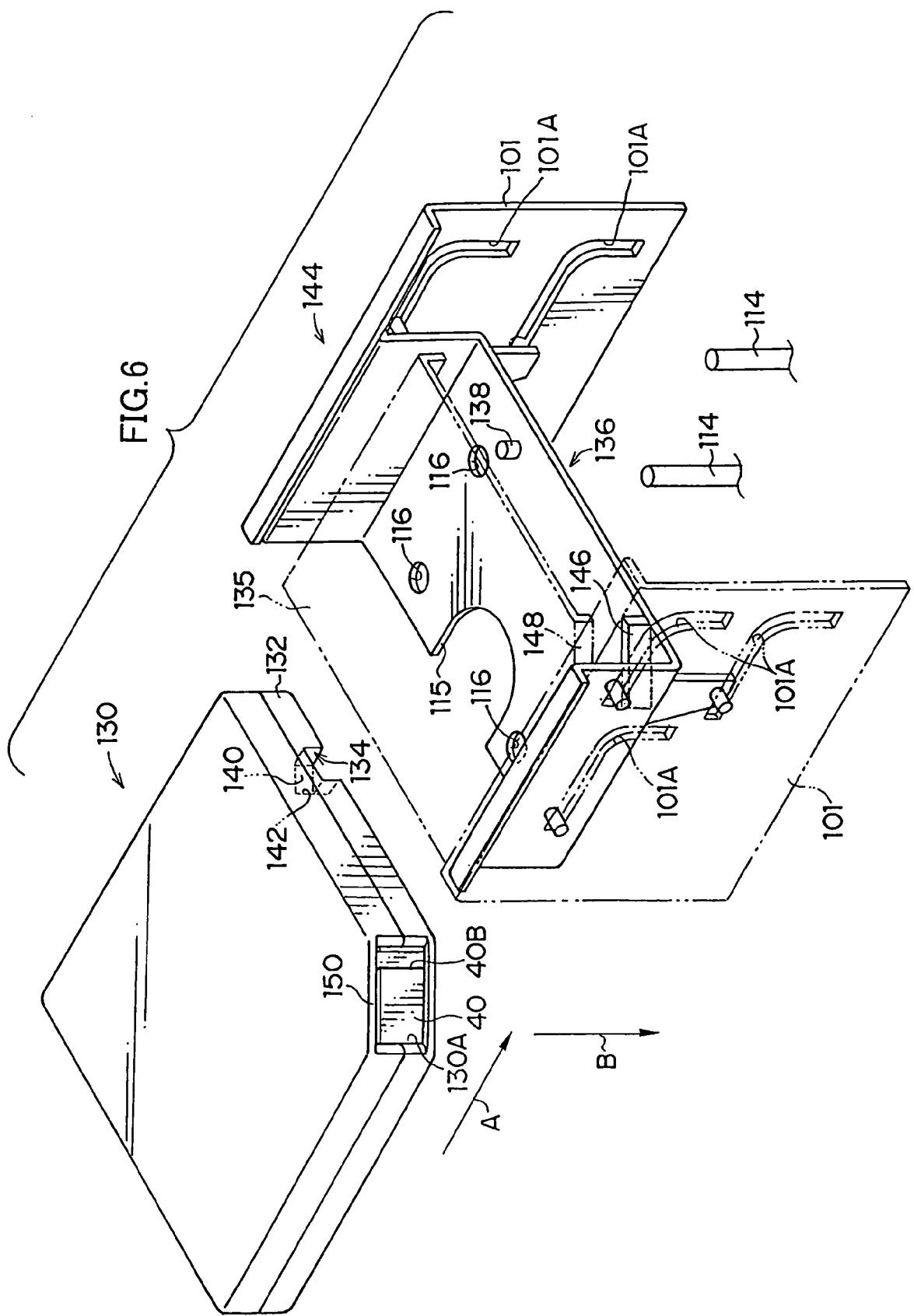

RECORDING TAPE CARTRIDGE AND DRIVE DEVICE THEREOF

This is a divisional of application Ser. No. 10/270,170, filed Oct. 15, 2002, now U.S. Pat. No. 6,811,107.

BACKGROUND OF THE INVENTION

1. Field of the Invention

The present invention relates to a recording tape cartridge and a drive device thereof for positioning a case accommodating a reel, upon which a recording tape such as a magnetic tape or the like is wound, in the drive device.

2. Description of the Related Art

Recording tapes such as magnetic tapes and the like are used as recording media for saving data (information) of computers and the like, for audio uses, for video uses, and the like. In order to prevent damage to a recording surface of such a recording tape, due to adherence of dust or the like to the recording surface, finger contact and the like, the recording tape is employed in a recording tape cartridge. In this recording cartridge, the recording tape is wound onto a reel and the reel is rotatably accommodated in a case formed of resin.

"Single reel cartridges", in which a recording tape wound onto a single reel is accommodated in a case (these are principally used for back-up of information for computers and the like), two-reel cartridges, which are provided with two reels for winding and unwinding (for example, audio cassettes, video cassettes and the like), and the like are known as recording tape cartridges. Whenever information is to be recorded or replayed with one of these recording tape cartridges, the recording tape cartridge is loaded at a drive device (a recording/replaying device).

In a state in which the recording tape cartridge has been loaded into the drive device and the case has been positioned in the drive device, the recording tape is drawn out of the case. This recording tape is guided along a predetermined tape path, and is set at a position close to a recording/replaying head of the drive device. In this state, information is recorded onto the recording tape and/or information that has been recorded on the recording tape is replayed.

As a method for positioning a recording tape cartridge in a drive device, there are methods such as that disclosed in Japanese Patent Application Laid-open (JP-A) No. 11-126398. In such a method, seat portions are provided in reference holes, which are provided at two places in a lower surface of the case. Respective positioning pins of the drive device are inserted, and the recording tape cartridge is positioned in horizontal directions. Further, positioning of the recording tape cartridge in a vertical direction is implemented by the positioning pins abutting against the seat portions.

There are many cases in which the reference holes are dually used as hole portions of bosses for screws, which usually fix an upper case and a lower case which constitute the case. However, in such cases, the positions of the reference holes are constrained by the bosses (or the positions of the bosses are constrained by the reference holes). Further, when the hole portions are formed in the case, formation failures such as short shot due to unsatisfactory filling of resin, coarsening of a design surface due to movement of air bubbles during forming, and the like tend to occur.

Furthermore, when hole portions are formed in a case, portions corresponding to the hole portions are usually provided as inserts fixed to a movable-side mold, which are separate bodies from a movable-side mold body. Consequently, flash may occur at a parting portion between the inserts and the movable-side mold body. There is a risk that stripping off this flash may have an undesirable effect on functioning of the tape.

Correspondingly, there are also cases in which inserts are fixed to a fixed-side mold. In such cases, if flash occurs at a parting portion between the inserts and the fixed-side mold, this flash is at an outer side of the case. Therefore, this will not have any effect on functioning of the tape. However, the outer side of the case is a design surface. Therefore, because parting lines will appear on the design surface, this method is not usually employed.

Accordingly, when hole portions are formed in a case, there is some damage due to the provision of inserts at a movable-side mold or a fixed-side mold. On the other hand, in cases in which inserts are not provided, gas retained at a deeper region of a hole portion cannot escape. As a consequence, short shot of a boss is induced. The deeper the depth of the hole, the more remarkably this tendency is exhibited.

SUMMARY OF THE INVENTION

In consideration of the situation described above, an object of the present invention is to provide a recording tape cartridge which can be assuredly positioned in a drive device without hole portions being provided.

A first aspect of the present invention is a recording tape cartridge which is loaded in a drive device therefor and used for at least one of recording and reading out information, the recording tape cartridge including: a case accommodating a rotatable reel on which a recording tape is wound; a first angled surface formed at a front end side in a loading direction of the case, the first angled surface abutting against a first reference portion provided at the drive device for providing a first angled surface position; a second angled surface formed at the front end side in the loading direction of the case, the second angled surface abutting against a second reference portion provided at the drive device for providing a second angled surface position, wherein a position of the case relative to the drive in horizontal directions is determined by the first and second angled surfaces.

According to the aspect of the present invention described above, the first angled surface and the second angled surface are provided at the front end side in the loading direction of the case in which the reel around which the recording tape is wound is rotatably accommodated. At least one of the first and second angled surfaces is preferably formed at a corner portion of the loading direction front end surface.

The first angled surface abuts against the first reference portion formed in the drive device, the second angled surface abuts against the second reference portion formed in the drive device, and thus the case and the first angled surface are positioned in the horizontal directions with respect to the drive device.

Here, the angled surfaces provide the principal function of positioning in X and Y directions. Thus, when the recording tape cartridge is pushed into the drive device, the case can be positioned in the horizontal directions (the X and Y directions) simply by the first and second angled surfaces abutting against the first and second reference portions, respectively. Accordingly, reference holes for positioning of the recording tape cartridge in the horizontal directions are not required.

Consequently, when an upper case and a lower case which constitute the case are fixed by screws, there is no need for bosses for the screws to also serve as reference holes. Thus, positions of the bosses are not limited by positions of the reference holes as in the prior art.

Moreover, because the reference holes need not be provided in the case, case formation defects due to provision of the reference holes, such as short shot, coarsening of a design surface due to movement of air bubbles, and the like, are eliminated.

Further, the first angled surface may be dually used as a drawing-out aperture portion. The aperture portion is usually an indispensable requirement of the case of the recording tape cartridge. Because this aperture portion is combined with the first angled surface, it is not necessary to provide the first angled surface separately, and molding process costs can be reduced correspondingly.

Yet further, the second angled surface may be dually used as a generation (type) identification portion, which distinguishes recording capacity, recording format or the like of the tape cartridge. This generation identification portion is generally an indispensable requirement of a case of a recording tape cartridge. Because the generation identification portion is combined with the second angled surface, it is not necessary to provide the second angled surface separately.

Moreover, in cases in which the case is positioned in a vertical direction with respect to the drive device by an underside surface of the case abutting against a reference pin disposed in the drive device, the underside surface of the case is abraded when the case is loaded or removed from inside the drive device, and may become scratched.

In such cases, if a recessed portion is formed in the underside surface of the case and a reference surface which abuts against the reference pin is provided inside this recessed portion, the recessed portion is not abraded when the case is loaded or removed from inside the drive device. Thus, the reference surface can be protected.

Further, the recording tape cartridge may comprise a recessed portion at a loading direction front end surface, and the recessed portion includes the second angled surface.

A second aspect of the present invention is a drive device to which a recording tape cartridge is loaded and used for at least one of recording information to and reading information from the recording tape cartridge, the recording tape cartridge including a case that has a recess portion, a first angled surface and second angled surface at a front end side in a loading direction of the recording tape cartridge, wherein the second angled surface is formed in the recess portion, the drive device comprising: a first reference portion disposed so as to be able to abut to the first angled surface of the case; a second reference portion disposed so as to be able to abut to the second angled surface, whereby the positioning of the recording tape cartridge relative to the drive device in horizontal directions is determined by respective abutting of the first and second reference portions against the first and second angled surfaces.

The drive device of the above aspect of the invention may further comprise a pin, which engages with the recess portion of the recording tape cartridge when the recording tape cartridge is loaded thereto and abuts against the second angled surface. The pin may have a polygonal pillar shape and a surface that is surface-contactable with the second surface.

BRIEF DESCRIPTION OF THE DRAWINGS

FIG. 6 is a perspective view showing another example of a magnetic tape cartridge relating to the embodiment of the present invention and a drive device in which the magnetic tape cartridge is to be loaded.

DESCRIPTION OF THE PREFERRED EMBODIMENTS

A magnetic tape cartridge relating to an embodiment of the present invention will be briefly explained. For convenience of explanation, front, back, left, right, up and down will be expressed with reference to a case of viewing in the direction of an arrow A, with a direction of loading the magnetic tape cartridge into a drive device (the direction of arrow A) being referred to as forward, and the direction of an arrow B being referred to as downward.

Figure 1:
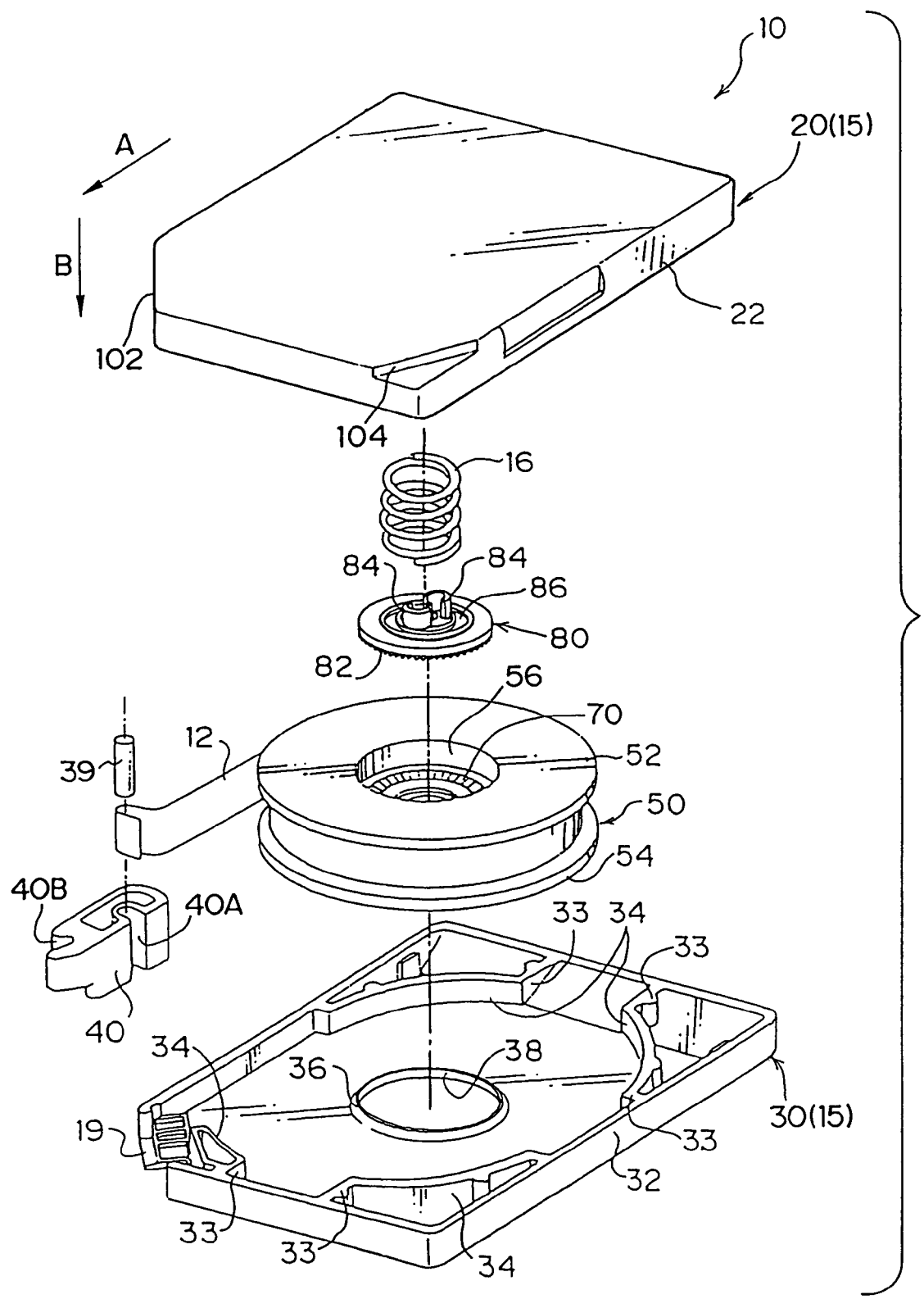
FIG. 1 is an exploded perspective view showing overall structure of a magnetic tape cartridge relating to an embodiment of the present invention.
Figure 2:
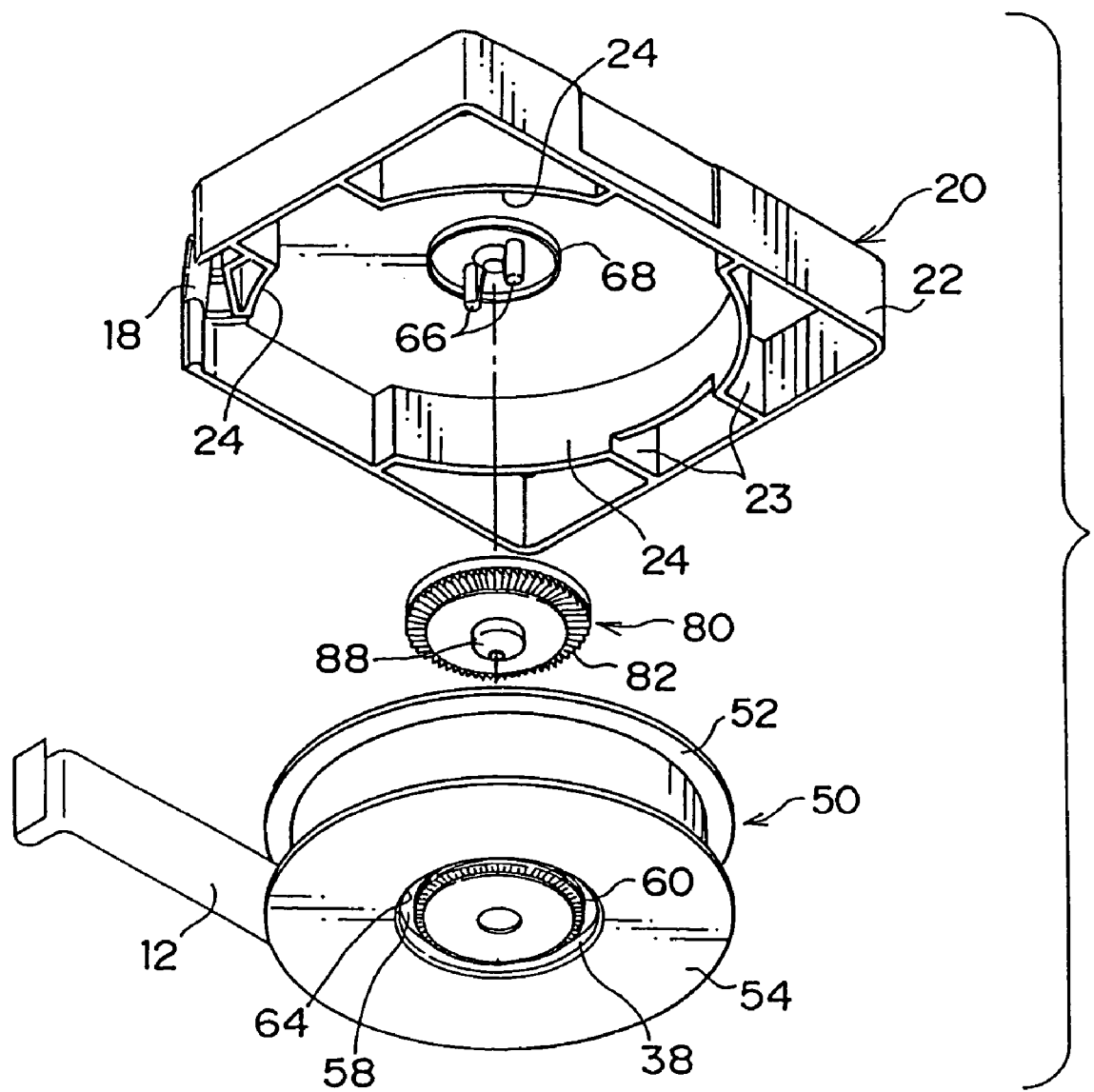
FIG. 2 is a perspective view of an upper case which constitutes the magnetic tape cartridge relating to the embodiment of the present invention, viewed from below.

As shown in FIGS. 1 and 2, a magnetic tape cartridge 10 is provided with a case 15 which is formed in a substantially rectangular box shape. This case 15 is constituted by an upper case 20 and a lower case 30, which are made of synthetic resin. A peripheral wall 22 of the upper case 20 and a peripheral wall 32 of the lower case 30 are welded by ultrasonic welding or the like to form the case 15.

Annular walls 24 and 34 (specifically, segments which constitute portions of annular walls) are respectively provided standing at interior portions of the upper case 20 and the lower case 30. Internal diameters of the annular walls 24 and 34 are slightly larger than external diameters of an upper flange 52 and a lower flange 54 of a reel 50. The reel 50 is rotatably accommodated in the annular walls 24 and 34.

A plurality of ribs 23 are provided between the annular wall 24 and the peripheral wall 22, and a plurality of ribs 33 are provided between the annular wall 34 and the peripheral wall 32. These ribs 23 and 33 connect the annular walls 24 and 34 with the peripheral walls 22 and 32, respectively, and are intended to strengthen the annular walls 24 and 34 and the peripheral walls 22 and 32.

The reel 50 is structured by a cylinder-shaped reel hub 56 and the upper flange 52 and the lower flange 54, which are provided at both end portions of the reel hub 56. A magnetic tape 12, which is an information recording/replaying medium, is wound around the reel hub 56. Lateral direction end portions of the magnetic tape 12 are retained by the upper flange 52 and the lower flange 54.

A bottom wall 58 is provided at a lower flange 54 side of the reel hub 56. A hole portion (not shown) is formed at the center of the bottom wall 58. At a lower surface side of the bottom wall 58, an annular reel gear 60 (driven gear) is formed protruding from the bottom wall 58.

Figure 3:
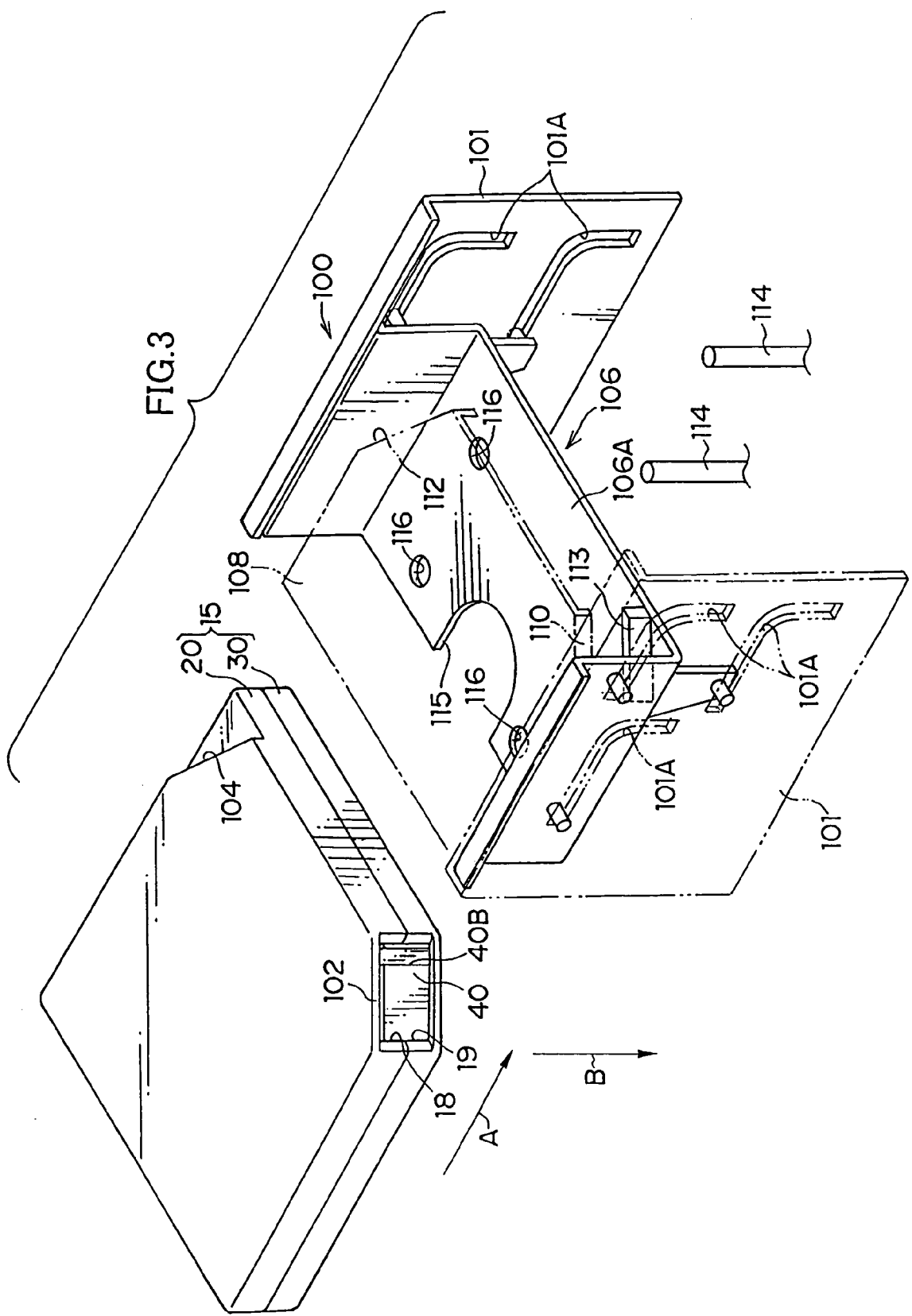
FIG. 3 is a perspective view showing the magnetic tape cartridge relating to the embodiment of the present invention and a drive device in which the magnetic tape cartridge is to be loaded.

The reel gear 60 can be exposed through a circular opening 38 formed at the center of the lower case 30. A drive device 100, shown in FIG. 3, is provided with a bucket 106. In a state in which the magnetic tape 10 is accommodated in the bucket 106, the reel gear 60 is disposed in a cutaway portion 115 which is formed in a mounting portion 106A of the bucket 106.

Thus, when the magnetic tape cartridge 10 is disposed at a predetermined position (described later), a driving gear provided at an unillustrated driving apparatus disposed at the drive device 100 meshes with the reel gear 60 shown in FIG. 2 and rotary force can be transmitted to the reel 50.

Further, an annular groove 64 is provided at an outer side of the reel gear 60. A rib 36 is provided standing at a circumferential portion of the opening 38 which is provided in the lower case 30. The rib 36 is inserted into the annular groove 64, and the reel 50 is positioned relative to the lower case 30.

As shown in FIGS. 1 and 2, an annular reel gear 70 is formed at an upper surface side of the bottom wall 58 of the reel hub 56. A braking gear 82 is provided at a lower surface outer peripheral portion of a substantially circular braking member 80, which is accommodatable inside the reel hub 56. The reel gear 70 is meshable with the braking gear 82.

Ribs 84 which are substantially U-shaped in plan view (below, referred to as "U-shaped ribs") are provided standing at an upper surface of the braking member 80, with opening sides thereof opposing one another. Correspondingly, a pair of locking pins 66 are pendant at the center of an inner surface of the upper case 20, and are engageable with the U-shaped ribs 84.

Consequently, the braking member 80 is moveable in the reel hub 56 such that the U-shaped ribs 84 (of the braking member 80) move along the locking pins 66, and rotation of the braking member 80 is prevented. Accordingly, when the magnetic tape cartridge 10 is not in use, the braking gear 82 of the braking member 80 meshes with the reel gear 70, and rotation of the reel 50 is prevented.

An annular groove 86 is provided at an outer side of the U-shaped ribs 84 of the braking member 80. An annular projection 68 is provided protruding at an outer side of the locking pins 66 of the upper case 20. A spring 16 is mounted between the braking member 80 and the upper case 20, and is retained by the annular projection 68 and the annular groove 86.

Consequently, the braking member 80 is urged toward the reel gear 70 side. The braking gear 82 and the reel gear 70 can be securely meshed, and undesired rotation of the reel 50 can be assuredly prevented.

A substantially circular pillar-shaped protrusion 88 is provided projecting from the center of the lower surface of the braking member 80. The protrusion 88 is insertable at the hole portion formed in the bottom wall 58. Via the protrusion 88, the braking member 80 can be pushed up in a direction opposing the urging force of the spring 16 by an unillustrated meshing release pin at the drive device 100 side (see FIG. 3). Thus, meshing of the braking gear 82 with the reel gear 60 is released, and the reel 50 becomes rotatable.

An angled surface 102, which is a first angled surface, is provided at a front-right corner portion of the peripheral wall 22 of the upper case 20 and the peripheral wall 32 of the lower case 30. Opening portions 18 and 19 are respectively formed in the angled surface 102. The opening portions 18 and 19 are provided for drawing-out of the magnetic tape 12 wound around the reel 50 to the outside.

Here, a distal end portion of the magnetic tape 12 is wound about a pin 39. The pin 39 engages with a recess portion 40A which is formed at a leader block 40. Thus, the magnetic tape 12 is integrated with the leader block 40. An engaging portion 40B of the leader block 40 is engaged by an unillustrated pull-out pin provided at the drive device 100 side, and the magnetic tape 12 is wound up by a take-up reel (not shown) which is provided at the drive device 100. At this time, the reel 50 and the take-up reel are driven to rotate simultaneously. While the magnetic tape 12 is being progressively taken up by the take-up reel, information is recorded and/or replayed.

When the magnetic tape cartridge 10 is not in use, the leader block 40 is engaged with the periphery of the opening portions 18 and 19 and does not protrude from the angled surface 102. Thus, the opening portions 18 and 19 are closed by the leader block 40.

An angled surface 104, which is a second angled surface, is provided at an upper side of a front-left corner portion of the peripheral wall 22 of the upper case 20. When the magnetic tape cartridge 10 is loaded into the bucket 106 (see FIG. 3) of the drive device 100 (see FIG. 3), the angled surface 104 is detected by an unillustrated proximity sensor, contact terminal or the like which is provided at the drive device 100. A generation of the magnetic tape cartridge 10 that has been loaded distinguishes a class of the magnetic tape cartridge 10 based on principal capabilities and/or specifications, for example, recording capacity, recording format, and the like, or a product series relating to such a class. The height of the angled surface 104 is different for each generation. Accordingly, it can be judged whether or not information therein can be recorded and/or replayed at the drive device 100.

Specifically, in a case in which a magnetic tape cartridge 10 with a high recording capacity (a higher generation recording tape cartridge) is loaded in a drive device 100 with a low recording/replaying ability (a lower generation drive device), information cannot be recorded on and/or replayed from this magnetic tape cartridge 10 by this drive device 100. Accordingly, in such a case, the impossibility of recording/replaying is judged using the angled surface 104, and the magnetic tape cartridge 10 is promptly ejected from the drive device 100.

Next, relevant features of a recording tape cartridge relating to the embodiment of the present invention will be explained.

As shown in FIG. 3, the angled surface 102, in which the opening portions 18 and 19 are formed for drawing-out of the magnetic tape 12, and the angled surface 104, for identifying the generation of the magnetic tape cartridge 10, are respectively provided at the front of the upper case 20.

Correspondingly, the bucket 106 which accommodates the magnetic tape cartridge 10 is provided in the drive device 100. The bucket 106 forms a substantial U-shape which opens upward. The bucket 106 is supported to be movable relative to a pair of side walls 101, which are provided in the drive device 100. Three guide holes 101A, which are substantially L-shaped in a side view, are formed in each of the pair of side walls 101. When the magnetic tape cartridge 10 is inserted, the bucket 106 is guided by the guide holes 101A, moving first in the direction of arrow A and then descending in the direction of arrow B.

A positioning cover 108 bridges across at a pair of side walls 106B of the bucket 106. The positioning cover 108 is positioned above the mounting portion 106A, on which the magnetic tape cartridge 10 is mounted, and is parallel to the mounting portion 106A. Stoppers 110 and 112 are respectively provided at corner portions of the positioning cover 108 that are positioned at a deeper side of the bucket 106.

A stopper 113 is provided standing at a right corner portion of the mounting portion 106A that is positioned at the deeper side of the bucket 106 (a front side in a mounting direction). The stopper 113 is disposed opposing a distal end surface of the stopper 110 and set at a predetermined separation therefrom, so as not to cover the opening portions 18 and 19 when the magnetic tape cartridge 10 is loaded into the bucket 106.

The angled surface 102 of the magnetic tape cartridge 10 is provided so as to be capable of surface-contactingly contacting surfaces of the stopper 110 and the stopper 113, and the angled surface 104 is provided so as to be capable of surface-contactingly contacting a surface of the stopper 112.

When the magnetic tape cartridge 10 is loaded into the bucket 106 of the drive device 100, an unillustrated driving means disposed in the drive device 100 pushes the bucket 106 toward the deeper side until the angled surface 102 surface-contactingly contacts with the stoppers 110 and 113, and the angled surface 104 surface-contactingly contacts with the stopper 112.

When the angled surface 102 of the magnetic tape cartridge 10 surface-contactingly contacts the stoppers 110 and 113, and the angled surface 104 surface-contactingly contacts the stopper 112, rotation in the horizontal directions is suppressed, and movement of the magnetic tape cartridge 10 is controlled. Thus, positioning of the magnetic tape cartridge 10 relative to the bucket 106 in the horizontal directions is achieved.

Here, the angled surfaces 102 and 104 have the function of positioning in X and Y directions. Thus, when the magnetic tape cartridge 10 is pushed into the bucket 106, the magnetic tape cartridge 10 can be positioned in the horizontal directions (the X and Y directions) in the drive device 100 simply by abutting the angled surfaces 102 and 104 against the stoppers 110 and 112, respectively. Therefore, reference holes for positioning the magnetic tape cartridge 10 in the horizontal directions are not required.

As a result, formation defects due to providing reference holes in the lower case 30 of the magnetic tape cartridge 10, such as short shot, coarsening of a design surface due to movement of air bubbles and the like are eliminated.

Because the magnetic tape cartridge 10 is positioned in the horizontal directions in the drive device 100 by the angled surfaces 102 and 104, positioning can be done with only two surfaces.

The angled surface 102, which is provided with the opening portions 18 and 19 for drawing-out of the magnetic tape 12 (see FIG. 1), serves as the first angled surface. The opening portions 18 and 19 are an indispensable requirement of the magnetic tape cartridge 10. Thus, because the angled surface 102 is dually used as the first angled surface, the first angled surface does not need to be provided separately. Thus, the cost of molding processing can be reduced by a corresponding amount.

The angled surface 104, which identifies recording capacity, recording format and the like of the magnetic tape cartridge 10 serves as the second angled surface. The angled surface 104 is generally an indispensable requirement for a magnetic tape cartridge 10 which is generation-identifiable. Thus, because the angled surface 104 is dually used as the second angled surface, the second angled surface does not need to be provided separately.

When the angled surface 102 and the angled surface 104 are both provided at one of the upper case 20 side and the lower case 30 side, the angled surfaces 102 and 104 are formed under the same conditions. Therefore, compared with, for example, a case in which the angled surface 102 is provided at the lower case 30 side and the angled surface 104 is provided at the upper case 20 side, the dimensional accuracies of the angled surface 102 and the angled surface 104 can be improved and the accuracy of positioning of the magnetic tape cartridge 10 can be raised.

In a mold in which the angled surface 102 and the angled surface 104 are formed, if the angled surface 102 is provided at a fixed-side mold, then it is preferable the angled surface 104 is also provided at the fixed-side mold (or if the angled surface 102 is provided at a movable-side mold, then it is preferable the angled surface 104 is also provided at the movable-side mold). As a result thereof, extremely high dimensional accuracy can be achieved.

The magnetic tape cartridge 10 is loaded into the bucket 106 of the drive device 100, positioning of the magnetic tape cartridge 10 in the horizontal directions relative to the bucket 106 is attained, and the bucket 106 moves in the direction of arrow A. Then, the bucket 106 moves downward in the direction of arrow B and stops. At this time, three positioning pins 114, which are disposed in the drive device 100, pass through penetration holes 116, which are formed in the mounting portion 106A of the bucket 106, and abut against an underside surface of the lower case 30.

Consequently, positioning of the magnetic tape cartridge 10 in the vertical direction is achieved as well as in the horizontal directions. The reel gear 60 (see FIG. 2) of the magnetic tape cartridge 10 is positioned in the cutaway portion 115 formed in the mounting portion 106A of the bucket 106. The reel gear 60 meshes with the unillustrated driving gear at the drive device 100 side, and the reel 50 (see FIG. 2) can be rotated.

Figure 4:
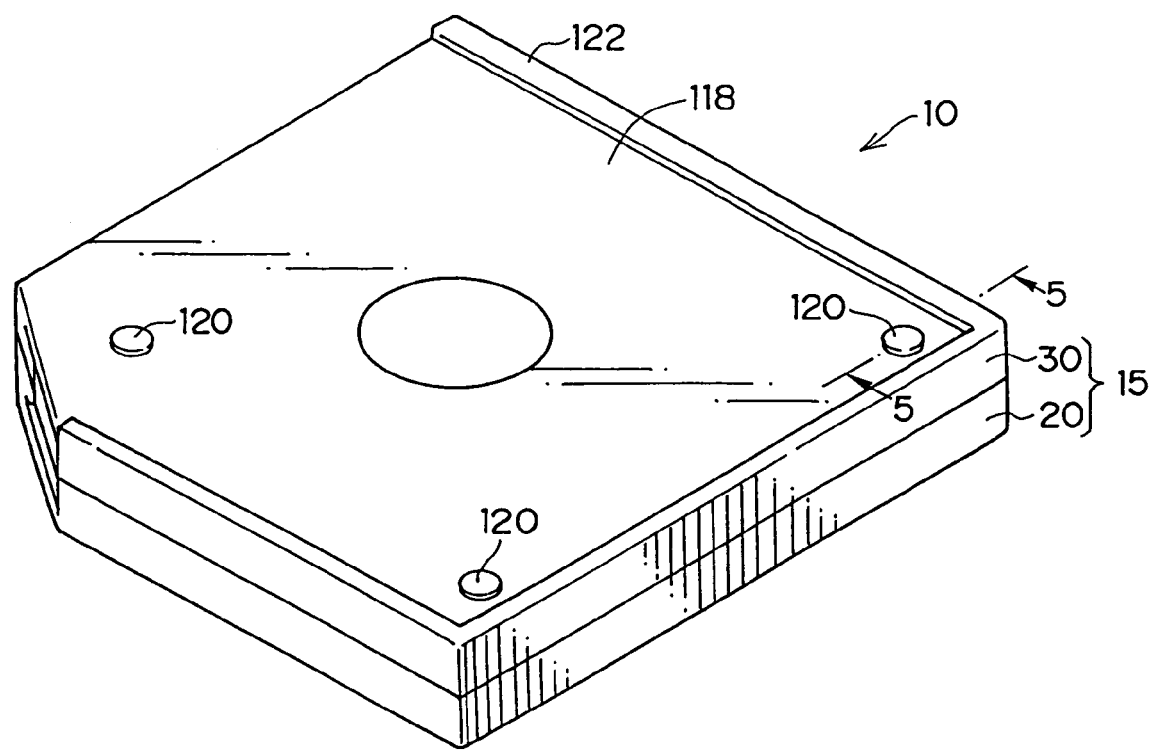
FIG. 4 is a perspective view showing a design recessed portion formed at an underside surface of a lower case which constitutes the magnetic tape cartridge relating to the embodiment of the present invention.
Figure 5:
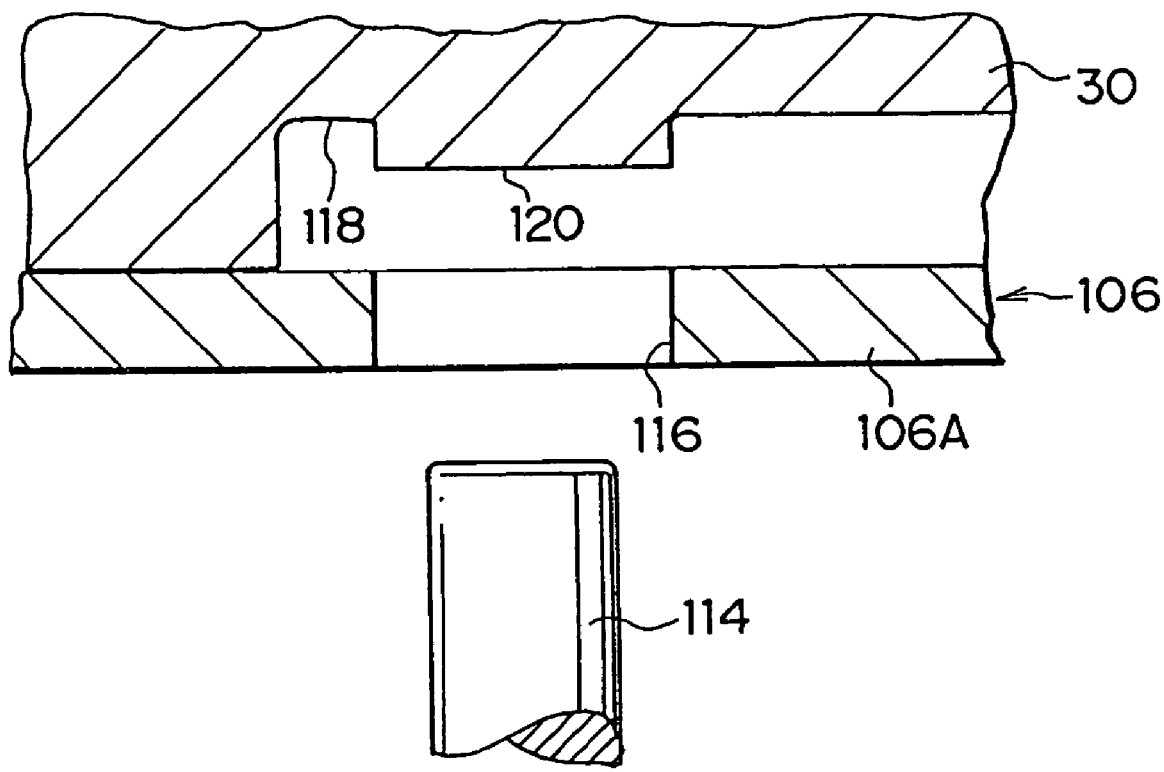
FIG. 5 is a view showing a section of a boss portion taken along the line 5—5 of FIG. 4, and a positioning pin of the drive device.

Here, as shown in FIGS. 4 and 5, a design recess portion 118, which is surface-textured so as to include places at which distal end surfaces of the positioning pins 114 will abut, is recessed into an outer bottom surface of the lower case 30. The design recess portion 118 is provided with bosses 120 at the places at which the positioning pins 114 will abut. Distal end surfaces of the bosses 120 serve as reference surfaces. The bosses 120 are set to a height such that the distal end surfaces (the reference surfaces) do not contact the bucket 106 in the state in which the magnetic tape cartridge 10 is loaded in the bucket 106.

Consequently, even when the magnetic tape cartridge 10 is being loaded into or ejected from the bucket 106, the distal end surfaces of the bosses 120 (reference surfaces) will not be abraded. Thus, the reference surfaces of the magnetic tape cartridge 10 in the vertical direction can be protected. As a result, positioning accuracy of the magnetic tape cartridge 10 in the vertical direction can be preserved.

Further, because the distal end surfaces of the bosses 120 (the reference surfaces) are set to a height so as not to abut against the bucket 106 in a state in which the magnetic tape cartridge 10 is loaded in the bucket 106, a protrusion height of the bosses 120 can be reduced. Because the bosses 120 are provided thus, concerns during formation about the problem of short shot do not arise.

Moreover, although the design recess portion 118 is formed, slippage of the magnetic tape cartridge 10 when the magnetic tape cartridge 10 has been loaded into the bucket 106 can be prevented by a rib 122 which is provided at a periphery of the design recess portion 118.

A depth of the design recess portion 118 is preferably set to 60% or less of a thickness at the periphery of the design recess portion 118 (in this case, a portion at which the rib 122 is provided). Because the design recess portion 118 is provided, the thickness of the lower case 30 is changed, but effects of the change in thickness can be reduced by setting the depth of the design recess portion 118 to 60% or less of the thickness at the periphery of the design recess portion 118.

In the present embodiment, for positioning the magnetic tape cartridge 10 loaded in the bucket 106 of the drive device 100 in the horizontal directions relative to the bucket 106, the angled surface 102, in which the opening portions 18 and 19 are formed for drawing-out of the magnetic tape 12 wound around the reel 50 as shown in FIGS. 1 and 2, is used as the first angled surface, and the angled surface 104 provided for identifying the generation is used as the second angled surface. However, as long as the magnetic tape cartridge 10 can be positioned in the horizontal directions relative to the bucket 106 (see FIG. 3), the present invention is not limited thus.

For example, as shown in FIG. 6, in a magnetic tape cartridge 130, the angled surface 104 for identifying the generation (see FIG. 3) need not be provided. With the magnetic tape cartridge 130, a round column-shaped engaging pin 138 may be provided at a bucket 136 side, to serve as a second stopper. A positioning recess portion 134 which is engageable with the engaging pin 138 may be recessed into a side wall of a lower case 132, to serve as the second angled surface.

Figure 7A:
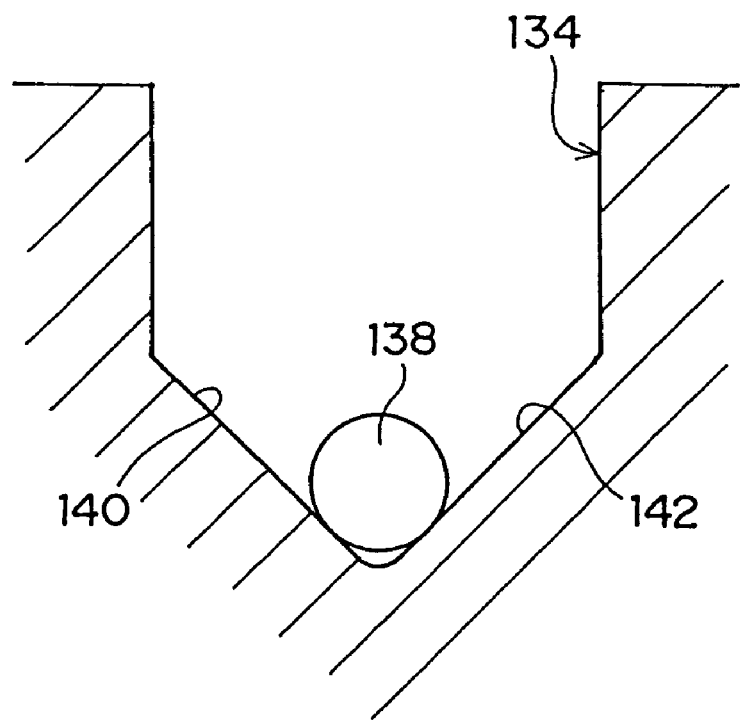
FIG. 7A is an explanatory view showing a second angled surface of the magnetic tape cartridge shown in FIG. 6.

As shown in FIG. 7A, the positioning recess portion 134 is wider at an entry side, is provided at an inner side with angled surfaces 140 and 142, and narrows in width towards the inner side.

As shown in FIG. 6, the engaging pin 138 is provided standing at a deeper side of the bucket 136. When the magnetic tape cartridge 130 is loaded into the bucket 136 and pushed in toward the deeper side of the bucket 136 by an unillustrated driving means disposed in a drive device 144, stoppers 146 and 148 which are provided at the bucket 136 and a positioning cover 135, respectively, abut against an angled surface 150, and the engaging pin 138 abuts against and engages with the angled surfaces 140 and 142 of the positioning recess portion 134. Accordingly, positioning of the magnetic tape cartridge 130 in the horizontal directions relative to the bucket 136 is achieved.

Figure 7B:
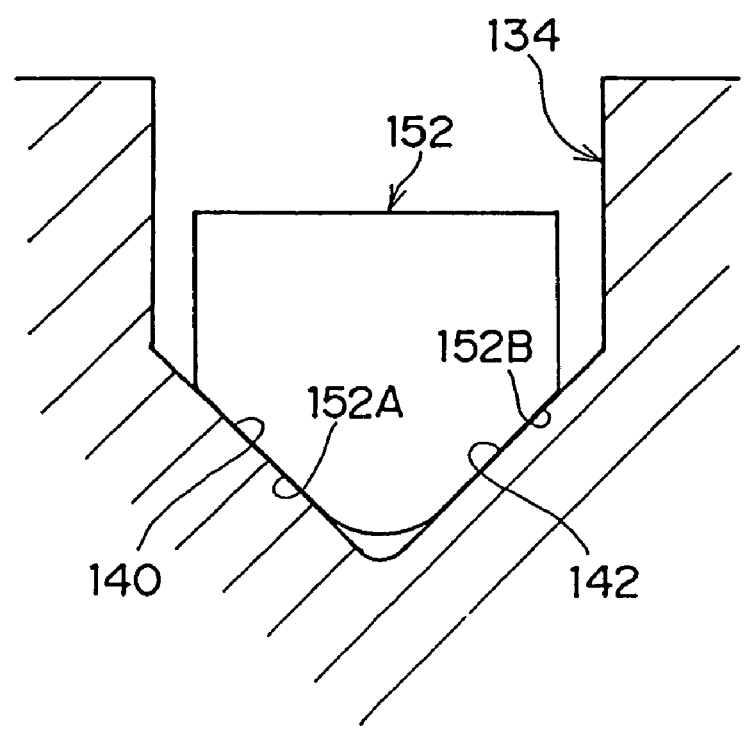
FIG. 7B is an explanatory view showing another example of an engaging pin.

Here, the engaging pin 138 has a circular pillar shape, but a circular pillar shape is not a necessary requirement, as long as the positioning recess portion 134 can be positioned by the engaging pin 138. For example, as shown in FIG. 7B, the engaging pin may be a polygonal pillar-shaped engaging pin 152 which has angled surfaces 152A and 152B, which are surface-contactable with the angled surfaces 140 and 142 provided at the positioning recess portion 134.

Besides the angled surface 104, the second angled surface may be separately provided as an abutting surface (not shown) such as an angled surface, a cutaway or the like. This abutting surface may be used together with the angled surface 104. Consequently, by combinations of the presence or absence of the angled surface 104 and the abutting surface, identification of three generations of magnetic tape cartridge can be performed. Further, besides the angled surface 102 in which the opening portions 18 and 19 are formed, the first angled surface may be separately provided as an abutting surface such as an angled surface, a cutaway or the like.

Figure 8:
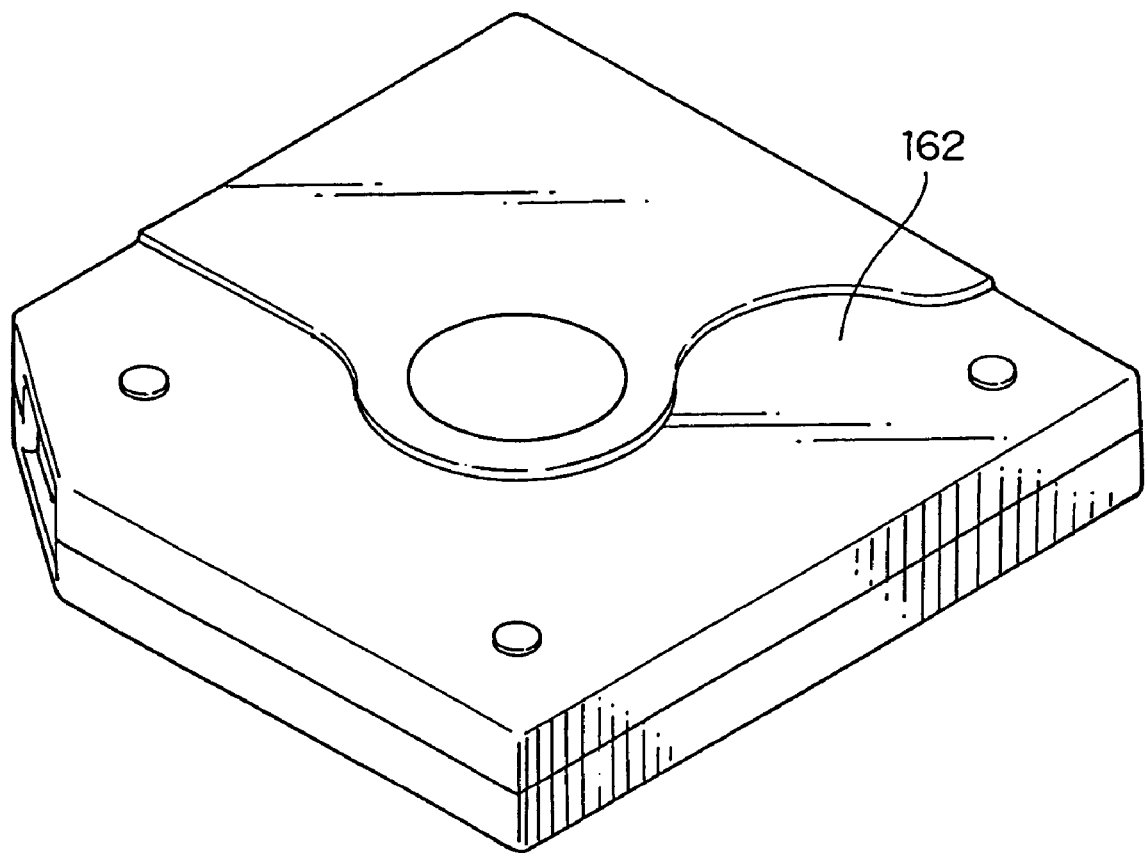
FIG. 8 is a perspective view showing another example of a design recessed portion formed in an underside surface of a lower case which constitutes a magnetic tape cartridge relating to the embodiment of the present invention.

In the present embodiment, as shown in FIG. 4, the design recess portion 118 is provided at the underside surface of the lower case 30. However, because it is sufficient that the design recess portion 118 has a form that includes the bosses 120 for abutting against the positioning pins 114 (see FIG. 5), the present embodiment is not limited to this form. For example, the forms shown in FIGS. 8 and 9 are acceptable.

Figure 9:
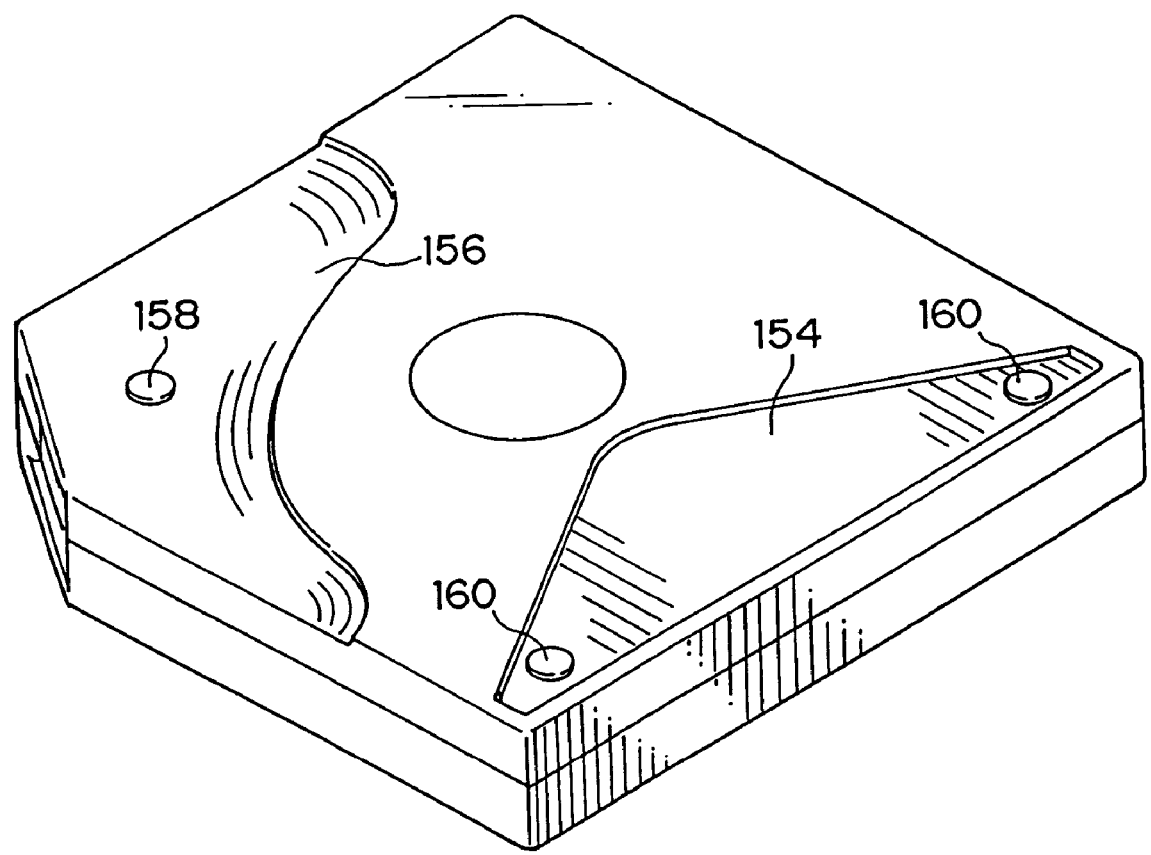
FIG. 9 is a perspective view showing yet another example of a design recessed portion formed in an underside surface of a lower case which constitutes a magnetic tape cartridge relating to the embodiment of the present invention.

As shown in FIG. 9, in a case in which design recess portions 154 and 156 are not continuous (that is, the design recess portion is divided), a balance of resin flow varies, and there is a risk that a state of flow of resin flowing to a reference surface 158 and a flow of resin flowing to reference surfaces 160 may be different. Therefore, compared with a case in which the design recess portion is divided, accuracy of reference surfaces will be better with a continuous design recess portion, such as the design recess portion 118 or a design recess portion 162 as shown in FIGS. 4 and 8.

The bosses 120 are provided projecting at the design recess portion 118, and distal end surfaces of the bosses 120 serve as the reference surfaces. However, the bosses 120 need not necessarily be formed, and the distal end surfaces of the positioning pins 114 may abut directly against the design recess portion 118. If a spacing of texturing marks in surface-texturing of the design recess portion 118 is made to be narrow, the distal end surfaces of the positioning pins 114 will abut against peak portions of a plurality of mountain portions in an unevenness portion formed by the surface texturing. Accordingly, accuracy of positioning of the magnetic tape cartridge 10 in the vertical direction can be preserved.

The leader block 40 is provided as a structure for drawing the magnetic tape 12 out of the case 15. However, the present invention is not limited thus. Obviously, a recording tape cartridge which is provided with some other drawing member instead of the leader block 40 may be used. Accordingly, the structure may be provided with, for example, a leader pin, a leader tape or the like.

An example of the magnetic tape cartridge 10 which rotatably accommodates the single reel 50 in the case 15 has been illustrated, but the present invention is not limited thus. For example, a magnetic tape cartridge provided with two reels for video applications or the like may be used.

Further, this structure uses the magnetic tape 12 as the recording tape, but the present invention is not limited to this. The recording tape of the present invention includes any long tape-like information recording/replaying medium which is capable of recording information and/or replaying information that has been recorded. Of course, the recording tape cartridge relating to the present invention can be applied to any recording/replaying-type recording tape.

Because the present invention has the structure described above, the angled surfaces provide the principal function of positioning in the X and Y directions. Thus, the recording tape cartridge is pushed into the drive device, and the case can be positioned in the horizontal directions (the X and Y directions) simply by the first and second angled surfaces abutting against the first and second stoppers, respectively. Accordingly, reference holes for positioning of the recording tape cartridge in the horizontal directions are not required. Consequently, when an upper case and a lower case which constitute the case are fixed by screws, there is no need for bosses for the screws to be combinedly used as reference holes. Thus, positions of the bosses are not limited by positions of the reference holes as in the prior art. Moreover, because the reference holes need not be provided in the case, case formation defects due to provision of the reference holes, such as short shot, coarsening of a design surface due to movement of air bubbles, and the like, are eliminated.

What is claimed is:

1. A drive device to which a recording tape cartridge is loaded and used for at least one of recording information to and reading information from the recording tape cartridge, the recording tape cartridge including a case that has a recess portion, a first angled surface and second angled surface at a front end side in a loading direction of the recording tape cartridge, wherein the second angled surface is formed in the recess portion, the drive device comprising:
    a bucket for receiving the case, the bucket having a positioning cover;
    a first reference portion, formed at least partially by an angled corner of the positioning cover, such that the first reference portion abuts the first angled surface of the case; and
    a second reference portion disposed so as to be able to abut to the second angled surface, whereby the positioning of the recording tape cartridge relative to the drive device in horizontal directions is determined by respective abutting of the first and second reference portions to the first and second angled surfaces.

2. The drive device of claim 1, wherein the second reference portion comprises a pin which engages with the recess portion of the recording tape cartridge when the recording tape cartridge is loaded thereto, and abuts to the second angled surface.

3. The drive device of claim 2, wherein the pin has a polygonal pillar shape and a surface that is surface-contactable with the second surface.

4. The drive device of claim 1, wherein the second reference portion is formed at least partially by a second angled corner of the positioning cover.

5. The drive device of claim 4, wherein the second angled corner of the positioning cover has a protrusion that projects towards a bottom surface of the bucket.

6. The drive device of claim 1, wherein the angled corner of the positioning cover has a protrusion that projects towards a bottom surface of the bucket.

7. A drive device to which a recording tape cartridge is loaded and used for at least one of recording information to and reading information from the recording tape cartridge, the recording tape cartridge including a case that has a recess portion, a first angled surface and second angled surface at a front end side in a loading direction of the recording tape cartridge, wherein the second angled surface is formed in the recess portion, the drive device comprising:
    a first reference portion including an abutting surface that is angled with respect to the loading direction, and formed such that the abutting surface at least partially abuts the first angled surface of the case;
    a second reference portion disposed so as to be able to abut to the second angled surface, whereby the positioning of the recording tape cartridge relative to the drive device in a horizontal direction is determined by respective abutting of the first and second reference portions to the first and second angled surfaces, and
    a bucket for receiving the case, the bucket having a mounting surface on which the case is placed, wherein the abutting surface is formed to protrude from the mounting surface.

8. The drive device of claim 7, wherein the mounting surface has a hole formed therein, and the drive device further has a positional pin that passes through the hole and abuts, at a distal end thereof, the case on the mounting surface, thereby positioning the case with respect to a direction that is perpendicular to the mounting surface.

* * * * *